United States Patent
Mitchell (10) Patent No.: US 7,496,525 B1
(45) Date of Patent: Feb. 24, 2009

(54) PURCHASE COORDINATOR FOR ELECTRONIC COMMERCE

(76) Inventor: Steven R Mitchell, 401 Nineteenth St., Manhattan Beach, CA (US) 90266

( * ) Notice: Subject to any disclaimer, the term of this patent is extended or adjusted under 35 U.S.C. 154(b) by 1381 days.

(21) Appl. No.: 09/528,466

(22) Filed: Mar. 17, 2000

(51) Int. Cl.
*G06Q 30/00* (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| | | | |
|---|---|---|---|
| 5,694,551 A * | 12/1997 | Doyle et al. | 705/26 |
| 5,970,472 A | 10/1999 | Allsop et al. | |
| 5,991,740 A * | 11/1999 | Messer | 705/27 |
| 6,058,373 A * | 5/2000 | Blinn et al. | 705/26 |
| 6,134,533 A * | 10/2000 | Shell | 705/26 |
| 6,263,317 B1 * | 7/2001 | Sharp et al. | 705/26 |

OTHER PUBLICATIONS

Sportsite.com: Internet Archive Wayback Machine, www.archive.org, www.sportsite.com; May 1998, 49pgs.*
fogdog.com: Internet Archive Wayback Machine, www.archive.org, www.fogdog.com; Jan. 16, 1998; 2pgs.*
Jastrow, David; "Vendors air concerns over EDI sites," Computer Reseller News, n788p45, May 11, 1998, Dialog #10196146, 2pgs.*

* cited by examiner

*Primary Examiner*—Robert M. Pond
(74) *Attorney, Agent, or Firm*—Blakely, Sokoloff, Taylor & Zafman, LLP (57) ABSTRACT

A method of doing business on the internet by which the manufacturer maintains an on-line presence without bypassing and without alienating the retailer and the distributor such that the manufacturer, distributor and independent retailer all share in the profits of on-line sales. The method employs a purchase coordinator that provides participating retailers with web sites affiliated with the manufacturer. The purchase coordinator obtains product data and price data from the manufacturer, distributor and retailer; receives orders from internet customers; selects a distributor to fill the order; and processes a monetary transaction for the order such that the distributor, retailer, and the manufacturers are each credited with a sum representing their portion of the total value of the order according to the price data.

53 Claims, 5 Drawing Sheets

PURCHASE COORDINATOR FOR ELECTRONIC COMMERCE

FIELD OF THE INVENTION

The invention relates to the field of electronic commerce. More specifically, the invention relates to a method for doing business by computer on the internet via the world wide web.

BACKGROUND

Figure 1:
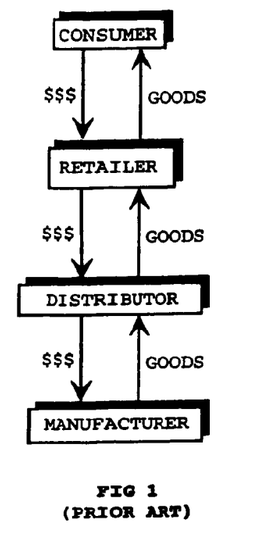
FIG. 1 (Prior Art) illustrates how goods and dollars flow in a traditional purchase of goods from an independent retailer.

We are all consumers. We all go shopping, be it for sporting goods, groceries, clothing, or soap. Traditionally, consumers purchase goods by physically going to a store and paying for the goods by cash, check or credit card. Traditionally, retailers obtain their goods from distributors (also known as wholesalers), and distributors obtain their goods from the manufacturer, as shown in FIG. 1. Likewise, when goods are sold by a retailer, the retailer receives payment from the consumer and then remits a sum to the distributor who, in turn, remits a sum to the manufacturer, also shown in FIG. 1. Sometimes the distributing wing of a manufacturer sells goods directly to the retailer. Larger retailers may also obtain goods directly from the manufacturer.

Figure 2:
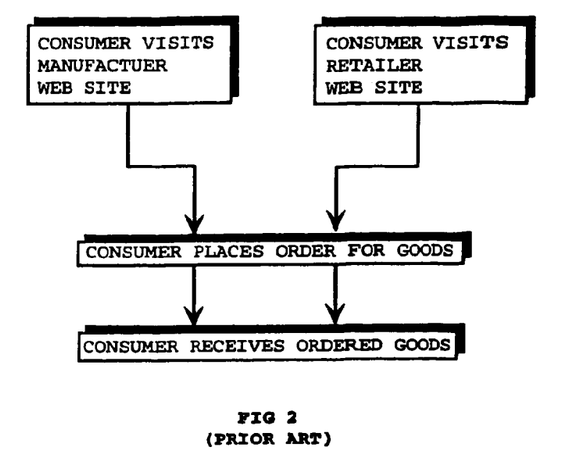
FIG. 2 (Prior Art) illustrates the actions taken by a consumer when purchasing goods from an internet web site.

With the advent of the world wide web on the internet, many consumers are now making purchases on-line in the comfort of their home through virtual stores and storefronts rather than venturing out to traditional bricks and mortar stores. When a consumer wants to purchase a good on-line, the consumer typically directs a computer's web browser (such as Netscape Communicator® available from Netscape Communications Corporation, Mountain View, Calif.) to the web site of a manufacturer or a large retailer, as shown in FIG. 2. If the consumer makes an on-line purchase from a manufacturer, the retailer and distributor are left out of the transaction. That is, in the present model of e-commerce, both the retailer and distributor are left out of on-line sales and effectively lose profits from the sales to which they are not a party. The manufacturer's on-line presence takes customers out of the physical store of independent retailers and decreases the sales volume of and, thus, the profits of independent retailers. When a manufacturer maintains its own web site and sells its products directly consumers, independent retailers have responded by dropping the manufacturer's line of products because the independent retailer does not want to compete with and lose business to the manufacturer's web site.

Independent retailers have difficulty competing with manufacturer's web sites as independent retailers cannot provide the same breadth of selection as a manufacturer. Independent retailers have limited resources and can only stock a portion of a manufacturer's product line due to storage and monetary constraints. Independent retailers cannot afford to obtain a full line of a manufacturer's products and do not have the physical space to store a full line of a manufacturer's products.

Moreover, both large retailers and manufacturers have greater resources than smaller independent retailers. These large retailers and manufacturers can afford to invest in complex web sites that include a consumer-friendly on-line sales component. Creating a rudimentary web site is simple, but preparing a professional web site to sell goods and process orders is a large undertaking, one that most small retailers cannot monetarily afford. Even if independent retailers can or do create their own web storefronts, the result is that the independent retailers are competing over the internet with the sales component of the manufacturer's web site.

What is needed is a method of doing business on the internet by which the manufacturer can maintain an on-line presence without bypassing and without alienating the retailer and the distributor such that the manufacturer, distributor and independent retailer all share in the profits of on-line sales.

BRIEF SUMMARY OF THE INVENTION

A method of doing business on the internet by which the manufacturer maintains an on-line presence without bypassing and without alienating the retailer and the distributor such that the manufacturer, distributor and independent retailer all share in the profits of on-lines sales. The method employs a purchase coordinator that provides participating retailers with web sites affiliated with the manufacturer. The purchase coordinator obtains product data and price data from the manufacturer, distributor and retailer; receives orders from internet customers; selects a distributor to fill the order; and processes a monetary transaction for the order such that the distributor, retailer, and the manufacturers are each credited with a sum representing their portion of the total value of the order according to the price data.

DETAILED DESCRIPTION

The present invention provides a method of doing business on the internet in which the retailer, distributor and manufacturer all participate in the profits of the sale of goods produced by the manufacturer. In this way, the manufacturer can maintain an on-line presence without bypassing and without alienating the retailer and the distributor.

Figure 3:
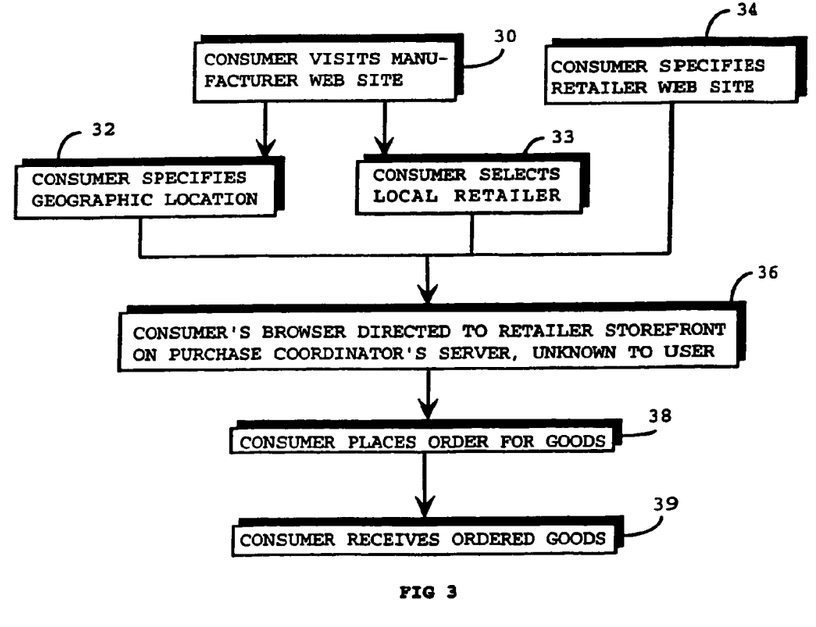
FIG. 3 illustrates the actions taken by a consumer when purchasing goods produced by a manufacturer.

FIG. 3 illustrates the actions taken by a consumer when purchasing goods produced by a manufacturer. When deciding to purchase a particular good produced by a manufacturer, consumers on the internet typically direct their web browsers to the web site of a manufacturer, as shown in block 30. According to the method of the present invention, the manufacturer displays its product line on its web site, but does not directly offer its goods for sale. As such, when a consumer visits the manufacturer's web site and decides to make a purchase, the consumer is directed to specify the geographic location from where the purchase will originate, as shown in block 32. This location is typically the business or home address of the consumer. After the consumer specifies a location, the consumer's browser is directed to the virtual storefront of a retailer geographically closest to the consumer, as shown in block 36. In another embodiment, the consumer selects from a list of geographically close retailers, as shown in block 33. After the consumer selects a retailer, the consumer's browser is directed to the virtual storefront of the selected retailer, as shown in block 36.

In one embodiment, the retailer's virtual storefront (i.e., web site) is created by the manufacturer for a fee. In another embodiment, the retailer's virtual storefront is created by a purchase coordinator company in coordination with the manufacturer such that the retailer pays either the manufacturer or the purchase coordinator company a fee for creating and hosting the retailer's virtual storefront. In these embodiments, the retailer's virtual storefront will have access to the product lines produced by the manufacturer that the retailer sells in the retailer's bricks and mortar location. In such an embodiment, the retailer benefits from having a professionally created web site, and the manufacturer benefits by having increased control of the quality and business image portrayed by retailers on retailers' virtual storefronts. In these embodiments, the retailer's web site is created by and stored on a server maintained by either the manufacturer or an entity retained by the manufacturer to serve as a purchase coordinator. A server is a computer running specialized software, for example, computers manufactured by Sun Microsystems of Mountain View, Calif.

From the consumer's view, the consumer is in the retailer's virtual store. The consumer then views the product line of the manufacturer that the retailer carries. The consumer then places an order for goods, as shown in block 38. After placing an order, the consumer receives the ordered goods at the consumer's designated address, as shown in block 39.

Consumers also shop for a manufacturer's products by looking for and connecting to a known local retailer's web site, as shown in block 34. After the consumer specifies the web site in a browser, the consumer's browser is directed to the retailer's virtual storefront which, unknown to the consumer, is located, in one embodiment, on a purchase coordinator's server, as shown in block 36. As discussed in the previous paragraph, according to one embodiment of the method of the present invention, the retailer's virtual storefront (i.e., web site) is created according to the manufacturer's specifications and resides on a server provided by a purchase coordinator retained by the manufacturer. In another embodiment, multiple manufacturers subscribe to or retain the purchase coordinator so that the retailers may carry goods from multiple manufacturers on the virtual storefronts created by the purchase coordinator. In yet another embodiment, the purchase coordinator is a division or department within the manufacturer's company such that the retailer's virtual storefront only carries goods from that manufacturer and its subsidiaries, if any.

Figure 4:
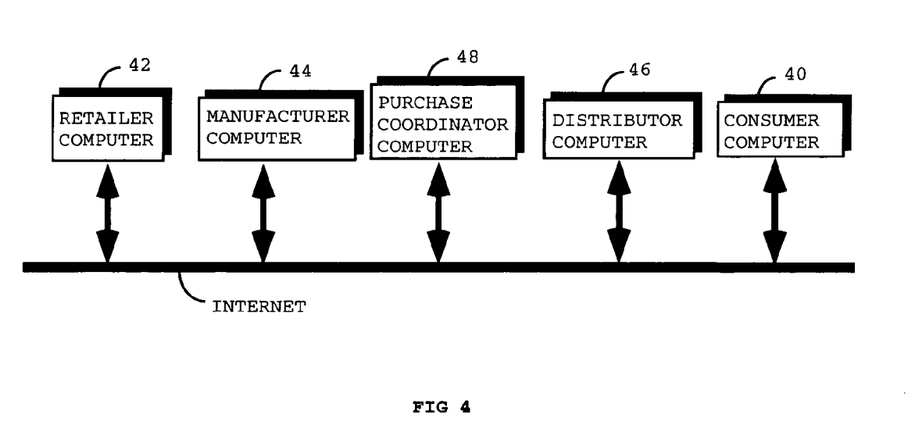
FIG. 4 illustrates the computers participating in a purchase of goods over the internet.

FIG. 4 illustrates the computers participating in a purchase of goods over the internet. According to one embodiment of the method of the present invention, a purchase of goods over the internet involves a consumer computer 40, a retailer computer 42, a manufacturer computer 44, a distributor computer 46, and a purchase coordinator computer 48. In one embodiment, each of these computers is attached to the internet as shown in FIG. 4. Such attachment is made according to methods known to those skilled in the art including but not limited to telephonic connection by modem and direct connection by T1, Integrated Services Digital Network (ISDN), or Digital Subscriber Lines (DSL). In one alternative embodiment, each of the computers is connected to one another by any means of computer communication that allows for the necessary data to be communicated between the various computers as will be set forth below. Such connections include, but are not limited to, direct dial-up, leased lines, etc. In one embodiment, multiple manufacturers, multiple retailers, multiple distributors and multiple consumers participate in the method of the present invention. In another embodiment, no distributors participate in servicing the consumer's purchase of goods. In such an embodiment, the manufacturer provides the services of the distributor.

Figure 5:
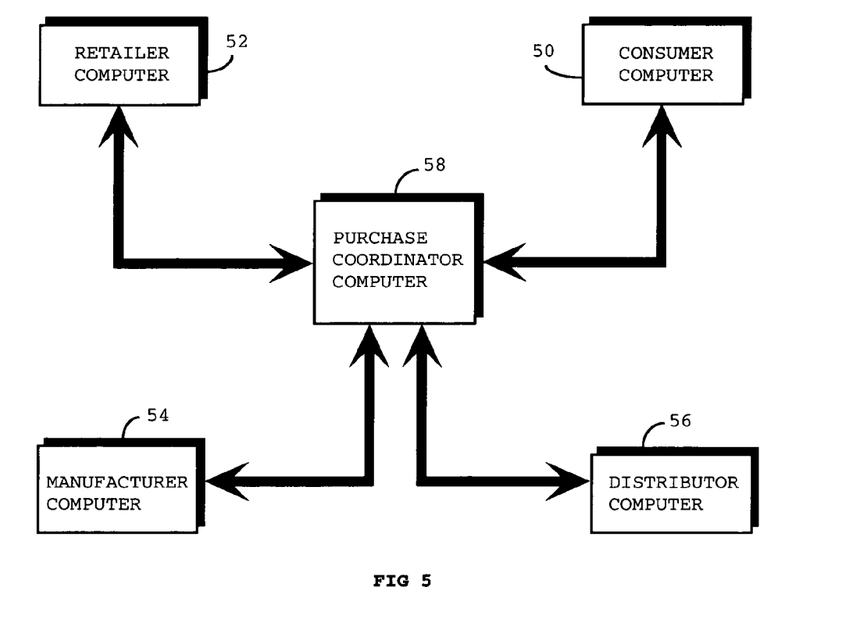
FIG. 5 illustrates the channels of communication between the computers of participants in a purchase of goods over the internet.

FIG. 5 illustrates the channels of communication between the computers of participating entities in a purchase of goods over the internet. To achieve the method of the present invention, each of consumer computer 50, retailer computer 52, manufacturer computer 54, and distributor computer 56 must be able to communicate with purchase coordinator computer 58. In one embodiment, each of these computers are connected to and communicate with one another as needed over the internet as shown in FIG. 4. In other embodiments, each of retailer computer 52, manufacturer computer 54, and distributor computer 56 is connected with purchase coordinator computer 58 by any means of computer communication known to those skilled in the art, including, but not limited to, direct dial-up, leased lines, etc. Although only one manufacturer, one distributor, one retailer and one customer are depicted in FIG. 4, multiple manufacturers, distributors, retailers and customers participate in the method of the present invention. In another embodiment, no distributors participate in servicing the consumer's purchase of goods. In such an embodiment, the manufacturer provides the services of the distributor.

Figure 6:
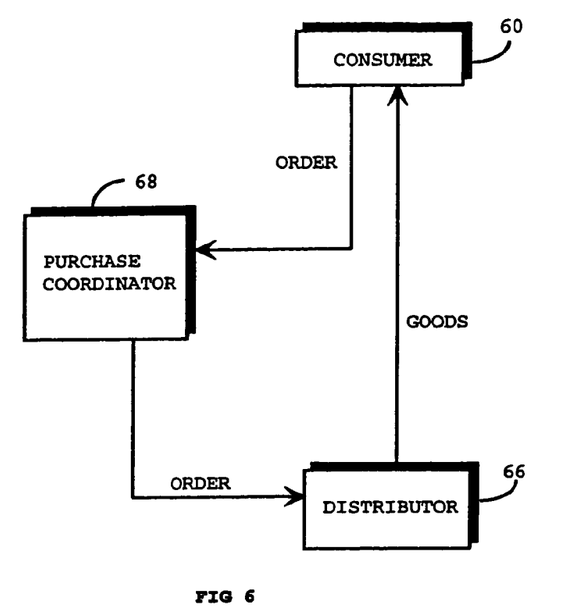
FIG. 6 illustrates the flow of an order for goods and the flow of goods between participants and their computers in a purchase of goods over the internet.

FIG. 6 illustrates the flow of an order for goods and the flow of goods between participants and their computers in a purchase of goods over the internet. In one embodiment, when consumer 60 decides to place an order, the consumer is connected to a retailer's virtual storefront on a purchase coordinator's server. When consumer 60 places an order for the manufacturer's goods on the local retailer's web site, unknown to the consumer, the consumer is actually connected to and placing an order via purchase coordinator 68 of the present invention. After consumer 60, places an order, purchase coordinator 68 selects an appropriate distributor 66 to fill the order. How a distributor is selected by the purchase coordinator is discussed below. The distributor then ships the ordered goods to consumer 60. In another embodiment, the consumer may choose to have the ordered goods shipped to the retailer. In such an embodiment, the consumer is notified by, for example, phone or electronic mail when the ordered goods arrive at the retailer's physical store so that the consumer travels to the retailer's physical store to pick up the ordered goods.

In another embodiment, the retailer may use a computer in the retailer's bricks and mortar store to go on-line to place an order from its own virtual storefront. In this embodiment, when a retailer is out of stock of a particular item requested by an in-store customer, rather than waiting for an order to be filled through traditional channels, the retailer orders from its own virtual storefront. In this embodiment, either at the retailer's choice or according to the customer's request, the retailer chooses to have the item shipped to an in-store customer's home or to the physical store so that the customer can pick up the item upon arrival. This method will increase customer satisfaction as the item will be received more quickly than through traditional channels.

The purchase coordinator may also be used to coordinate the product stock levels between distributors and manufacturers. As distributors' inventory levels of manufacturers' goods are available on the purchase coordinator, when the manufacturer obtains inventory data showing that certain inventory is running low, the manufacturer can automatically send a new shipment of goods to the distributor according to whether the distributor has configured its participation in the method by setting a field to send when low inventory which also defines a numeric threshold that qualifies as low inventory. In this way the purchase coordinator also serves as an inventory manager between the distributors and the manufacturers.

Figure 7:
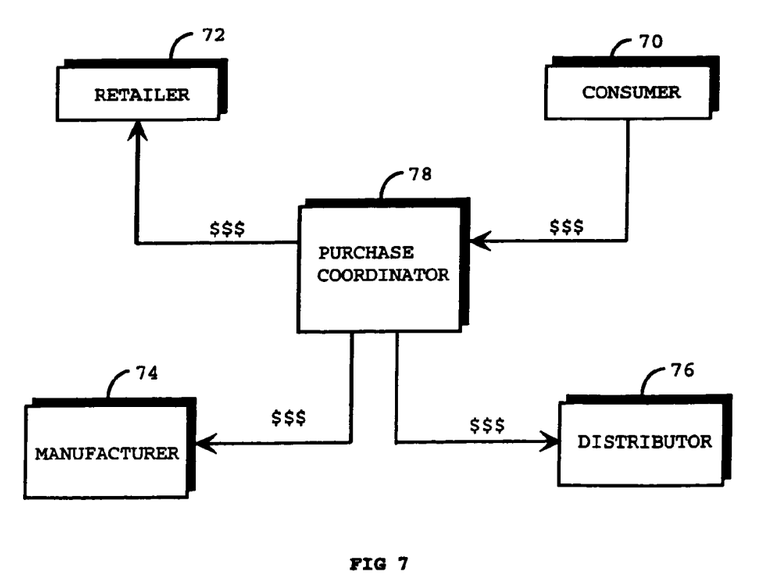
FIG. 7 illustrates the flow of money between participants in a purchase of goods over the internet.

FIG. 7 illustrates the flow of money between participants in a purchase of goods over the internet. When consumer 70 places an order for goods, the consumer provides a credit card account number to pay for the order. When placing the order, the consumer's credit card account is not debited, but approval for the transaction is obtained by communicating with a financial institution according to methods known to those skilled in the art. Upon a distributor shipping an order, purchase coordinator 78 debits the total value of the order against the credit card account of consumer 70. In one embodiment, purchase coordinator 78 contemporaneously credits retailer 72, distributor 76 and manufacturer 74 appropriate portions of the total value of the order. In other embodiments, purchase coordinator 78 credits retailer 72, distributor 76 and manufacturer 74 the appropriate sum of multiple orders accumulated over a designated time period such as, for example, hourly, twice a day, daily, and weekly. How the monies are allocated among the retailer, manufacturer and distributor is discussed below. In one embodiment, purchase coordinator 78 also credits itself with a commission in a predetermined sum for handling the transaction. In various embodiments, this predetermined sum is a flat rate, a set percentage, or varying based on the goods or dollar amount of the order or the goods.

Regardless of whether the crediting takes place contemporaneously, daily or weekly according to the various embodiments of the method of the invention, the time of payment to the manufacturer is much earlier than in the traditional bricks and mortar business method where the manufacturer typically floats credit to the retailer and distributor for between thirty and ninety days. Likewise, speed of payment to the distributor is increased over the traditional bricks and mortar business method where the distributor typically float credit to the retailer for between thirty and ninety days.

Figure 8:
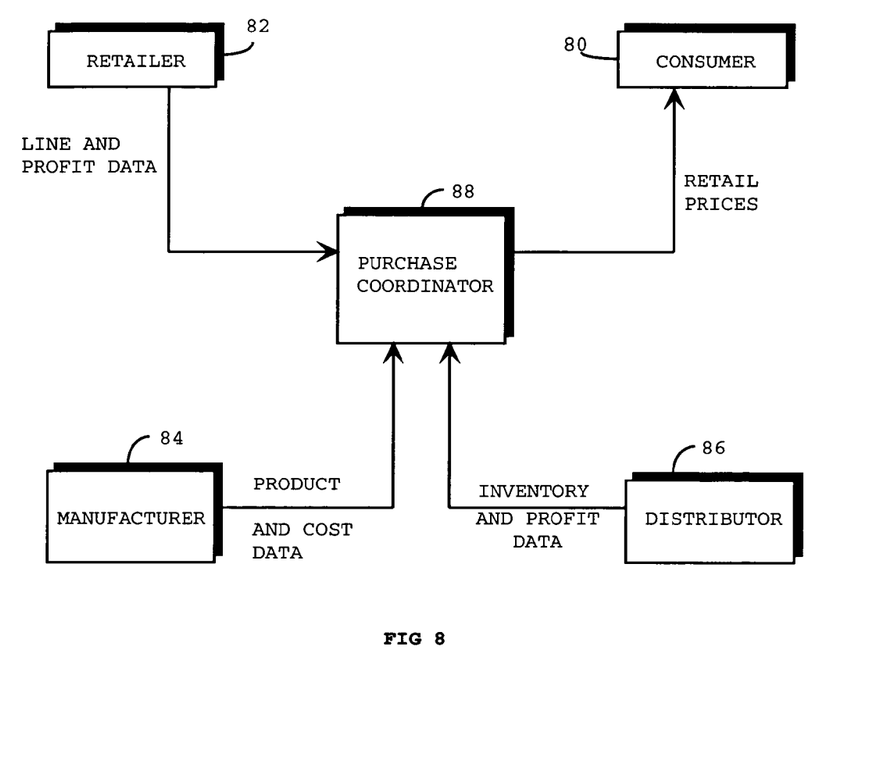
FIG. 8 illustrates the flow of goods-related data between the computers of participating entities in a purchase of goods over the internet.

FIG. 8 illustrates the flow of goods-related data between the computers of participating entities in a purchase of goods over the internet. When manufacturer 84 chooses to do business on the internet according to the method of the present invention, manufacturer 84 forwards product data and cost data to purchase coordinator 88 for all goods in all of its lines. In one embodiment, this is achieved by sharing database files in any manner known to those skilled in the art. In an alternative embodiment, cost data is provided to the purchase coordinator company in hard copy form and entered into the purchase coordinator computer by the purchase coordinator in any manner known to those skilled in the art, including manual data entry and optical character recognition (OCR) scanning.

When retailer 82 chooses to enter into internet commerce with a manufacturer who does business over the internet according to the method of the present invention, retailer 82 provides purchase coordinator 88 with product line data for items for sale on the web site. In one embodiment, each item in each line of the manufacturer's goods the retailer sells in its bricks and mortar storefront is provided as line data. In this way, the virtual storefront's selection will mimic the physical storefront's selection. In other embodiments, the product lines on the retailer's virtual storefront and defined by the line data are larger or smaller than the retailer's physical store stock depending on the requirements of the retailer and/or the manufacturer.

With regard to retailer profit data, in one embodiment, the retailer profit data provided by retailer 82 to purchase coordinator 88 is a fixed sum that varies from item to item. In another embodiment, the retailer profit data is a set percentage above underlying costs that varies for each item. In still another embodiment, the retailer profit data is a set percentage of underlying costs that is the same for each item. In yet another embodiment, support for all of the prior embodiments is provided by purchase coordinator 88. In one embodiment, underlying costs include the sum of the manufacturer's cost and the distributor's profit. In one embodiment, retailer line data and retailer profit data are provided electronically in a well known database format, as discussed above with regard to manufacturer product data and cost data. In an alternative embodiment, this information is provided in hard copy form, also as discussed above with regard to manufacturer product data and cost data.

In a further embodiment, retailers provide a default retailer profit data. The default retailer profit data is used when the manufacturer and distributor introduce and stock new products, respectively. In this embodiment, when a new product is introduced and stocked, the purchase coordinator uses the default retailer profit data for all newly added items until the retailer modifies retailer profit data for the particular new item. In this way, no retailer input is required for a retailer to sell newly introduced products from the retailer's web site. Default retailer profit data may be specified as set forth above with regard to retailer profit data.

When a distributor participates in the method of the present invention, distributor 86 initially provides purchase coordinator 88 with inventory data setting forth the quantities of the manufacturer's products it has on hand. Distributor 86 also provides purchase coordinator 88 with distributor profit data. Similar to the retailer profit data discussed above, in one embodiment, distributor profit data is a fixed sum that varies from item to item. In another embodiment, distributor profit data is a set percentage above manufacturer's cost that varies for each item. In still another embodiment, distributor profit data is a set percentage above manufacturer's cost that is the same for each item. In yet another embodiment, support for all of the prior embodiments is provided by purchase coordinator 88. In one embodiment, this information is provided electronically in a well known database format, as discussed above with regard to manufacturer product data and cost data. In an alternative embodiment, distributor inventory data and distributor profit data is provided in hard copy form, also as discussed above with regard to manufacturer product data and cost data.

Retail prices are determined by purchase coordinator 88 and provided to consumer 80. In one embodiment, the retail price of an item is the sum of the manufacturer cost, the distributor profit and the retailer profit for the item. In another embodiment, a purchase coordinator commission is added to the sum of the manufacturer cost, the distributor profit and the retailer profit to arrive at the retail price.

In a further embodiment, more than one distributor may be involved in servicing a consumer's purchase. In such an embodiment, multiple levels of distributors pass the item up the chain or distribution from the manufacturer to the consumer. In such an embodiment, the purchase coordinator only selects the highest level distributor to service an order. However, each distributor participating in the chain of distribution provides distributor profit data to the purchase coordinator. In such an embodiment, the purchase coordinator determines the retail price by including distributor profit for each of the distributors participating in the chain of distribution with the manufacturer cost and the retailer profit for the item.

In another embodiment, shipping costs may be handled by the purchase coordinator in various ways. In one embodiment, shipping costs are shared among the purchase coordinator, the manufacturer and the distributor. In yet other embodiments, shipping costs are assigned to one or a combination of the purchase coordinator, the manufacturer and the distributor. In some such embodiments, the shipping costs are used by the purchase coordinator in determining the retail price of the items. In other embodiments, the shipping cost is separate from the retail price and is paid by the consumer.

Figure 9:
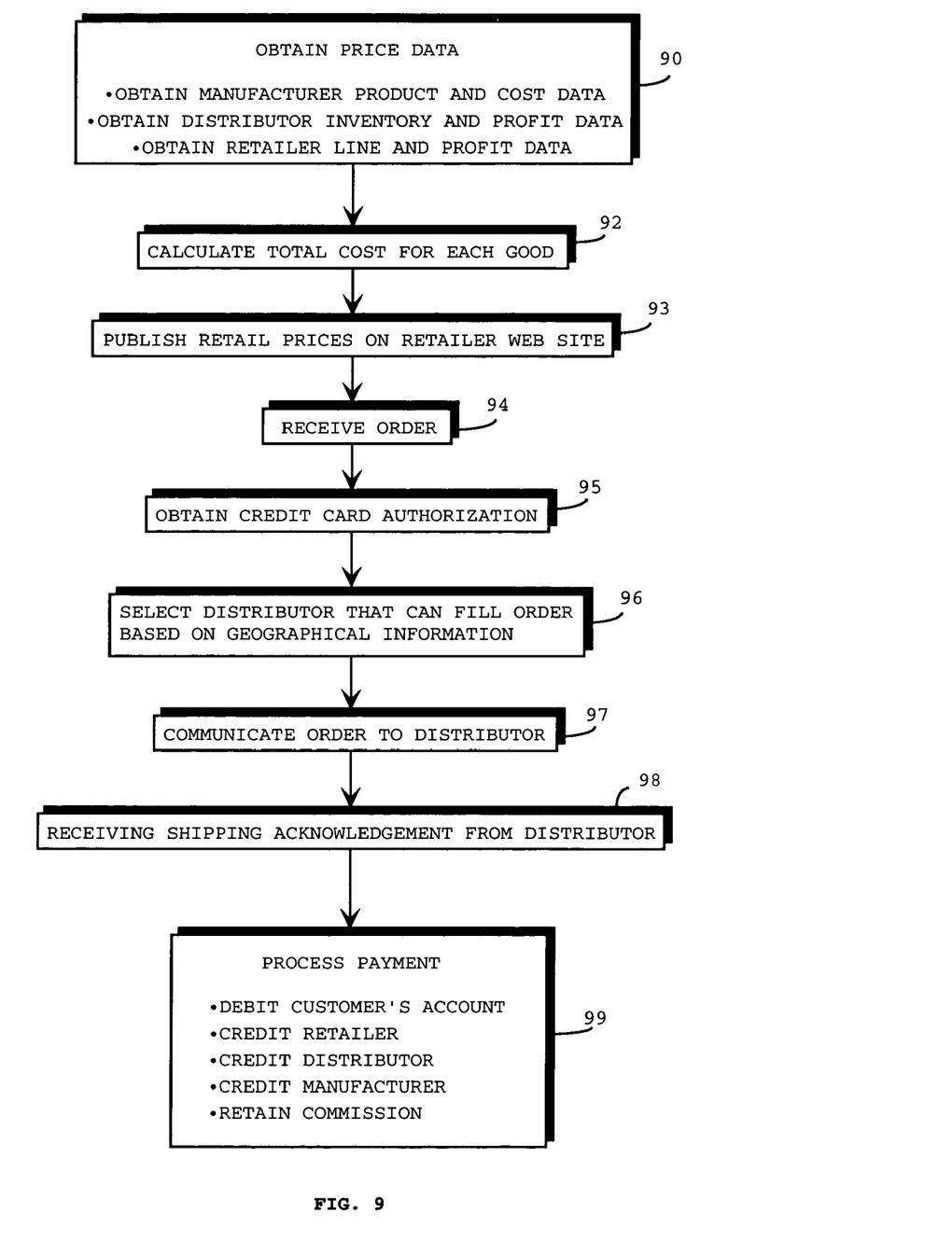
FIG. 9 illustrates the actions taken by a purchase coordinator.

FIG. 9 illustrates the actions taken by a purchase coordinator. When a manufacturer chooses to do business on the internet according to the method of the present invention, the manager retains a company to serve as a purchase coordinator and provide a purchase coordinator computer to facilitate electronic commerce over the internet. As shown in block 90, the purchase coordinator obtains manufacturer product data and cost data for all goods in all of its lines, retailer product line data and retailer profit data from participating retailers, and distributor inventory data and distributor profit data from participating distributors. In one embodiment, all of this data is received electronically over the internet by database methods known to those skilled in the art. In another embodiment, some of the manufacturers and distributors provide this data via other electronic communication means including, but not limited to, direct-dial telephone connection and leased line. In still an other embodiment, the purchase coordinator obtains data in hard copy form and enters the data into the purchase coordinator computer in any manner known to those skilled in the art, including, but not limited to, manual data entry and optical character recognition (OCR) scanning.

As shown in block 92, the purchase coordinator then determines the retail price for each of the goods. The retail price is the price that will be charged to consumers for a particular good. In one embodiment, the retail price of an item is the sum of the manufacturer cost, the distributor profit and the retailer profit for the item. In another embodiment, a purchase coordinator commission is added to the sum of the manufacturer cost, the distributor profit and the retailer profit to arrive at the retail price. In another embodiment, shipping costs are shared among the purchase coordinator, the manufacturer and the distributor. In yet other embodiments, shipping costs are assigned to one or a combination of the purchase coordinator, the manufacturer and the distributor. In some such embodiments, the shipping costs are used by the purchase coordinator in determining the retail price of the items. In other embodiments, the shipping cost is separate from the retail price and is paid by the consumer.

After the retail price for goods is determined, in one embodiment, the purchase coordinator stores the retail price and publishes the retail prices on participating retailers' virtual storefronts when product and/or pricing information is accessed by consumers, as shown in block 93. In another embodiment, the purchase coordinator computes the retail price for goods on demand, according to the above formula, whenever a consumer requests information on or the retail price for an item for sale on the retailer's virtual storefront. The purchase coordinator then receives an order from a consumer over the internet, as shown in block 94.

Upon receiving an order for goods, the purchase coordinator obtains authorization for the requested credit card transaction according to methods known in the art, as shown in block 95. In one embodiment, this is achieved over the internet. In other embodiments, this is accomplished over, for example, a direct-dial telephone connection with a financial institution.

The purchase coordinator then selects a distributor that can fill the entire order based on geographical information, as shown in block 96. In one embodiment, the purchase coordinator selects a distributor geographically closest to the consumer. In another embodiment, the purchase coordinator selects a distributor closest to the retail store on whose virtual storefront the consumer placed the order. In yet another embodiment, the purchase coordinator selects multiple distributors and splits the orders between them. The purchase coordinator then communicates the order to the selected distributor, as shown in block 97. In one embodiment, this is achieved over the internet. In another embodiments this is accomplished over, for example, a leased line or by direct-dial telephone connection. After the distributor ships the goods, the purchase coordinator receives an acknowledgement from the distributor as shown in block 98.

Upon receiving a shipping acknowledgement, the purchase coordinator then processes the payment for the order, as shown in block 99. Processing the payment includes, in one embodiment, contemporaneously debiting the total value of the order against the credit card account of the consumer and crediting the participating retailer, the distributor and the manufacturer appropriate portions of the total value of the order, as set forth above. That is, the purchase coordinator credits the retailer the proper amount according to the retailer profit data for the goods purchased, credits the distributor the proper amount according to the distributor profit data for the goods purchased, and credits the manufacturer the proper amount according to the manufacturer cost data for the goods purchased. In other embodiments, the purchase coordinator credits the participating retailer, the distributor and the manufacturer the appropriate sum of multiple orders accumulated over a designated time period such as, for example, hourly, twice a day, daily, and weekly. In one embodiment, the purchase coordinator also credits itself with a commission in a predetermined sum for handling the transaction. In various embodiments, this determined sum is a flat rate, a set percentage, or varying based on the goods or dollar amount of the order or the goods.

The methods describe herein may be stored as a set of instructions upon a machine readable medium that can be executed by a processor and thereby cause a machine to perform the described operations.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   obtaining price data in a computer, the price data from each of a plurality of retailers and at least one manufacturer for a plurality of goods;
   receiving an order in the computer, the order for at least one of the plurality of goods;
   electronically processing a monetary transaction for the order such that the manufacturers of the goods in the order and one of the plurality of retailers are each credited with a sum representing their portion of a total value of the order according to the price data.

2. The method of claim 1 further comprising:
selecting one of a plurality of manufacturer warehouses to fill the order.

3. The method of claim 2 wherein selecting one of a plurality of manufacturer warehouses comprises:
identifying one manufacturer warehouse capable of filling the order such that the manufacturer warehouse is geographically closest to either a customer or a customer selected retailer.

4. The method of claim 3 wherein selecting one of a plurality of manufacturer warehouses further comprises:
identifying one manufacturer warehouse that is in the same country as the customer.

5. The method of claim 1 wherein obtaining price data comprises:
obtaining a manufacturer cost for goods supplied by the manufacturer; and
obtaining from the retailers a retailer profit data for the goods the retailer sells.

6. The method of claim 5 further comprising:
establishing the retailer profit data as either a percentage above the manufacturer cost, or a specified sum.

7. The method of claim 5 further comprising:
varying the retailer profit data among the goods sold by the retailer.

8. The method of claim 5 further comprising:
establishing the retailer profit data as the same for each of the goods sold by the retailer.

9. The method of claim 5 further comprising:
determining a retail price of the plurality of goods by using the manufacturer cost and the retailer profit data for the good.

10. The method of claim 1 further comprising:
receiving the order from either a consumer or one of the plurality of retailers.

11. The method of claim 1 further comprising:
debiting the total value of the order against a credit card account of the customer.

12. The method of claim 11 wherein debiting the total value is performed after the order is shipped.

13. The method of claim 12 wherein processing a monetary transaction is performed immediately after debiting the total value.

14. The method of claim 1 wherein processing a monetary transaction is performed at a defined regular interval for multiple orders after the orders have shipped.

15. The method of claim 1 wherein processing a monetary transaction comprises:
retaining a commission.

16. The method of claim 1 further comprising:
obtaining goods-related data from each of the retailers and each of the manufacturers.

17. The method of claim 16 wherein obtaining goods-related data comprises:
obtaining a product data and an inventory data from each of the manufacturers; and
obtaining a product line data from each of the retailers.

18. A method comprising:
obtaining price data in a computer, the price data from each of a plurality of retailers, a plurality of distributors, and at least one manufacturer for a plurality of goods;
receiving an order at the computer, the order for at least one of the plurality of goods;
selecting one of the plurality of distributors to fill the order;
electronically processing a monetary transaction for the order such that the distributor selected to fill the order, one of the plurality of retailers, and the manufacturers of the goods in the order are each credited with a sum representing their portion of a total value of the order according to the price data.

19. The method of claim 18 wherein obtaining price data comprises:
obtaining a manufacturer cost for goods supplied by the manufacturer;
obtaining from each of the distributors a distributor profit data for the goods the distributor distributes; and
obtaining from the retailers a retailer profit data for the goods the retailer sells.

20. The method of claim 19 further comprising:
establishing distributor profit data as either a percentage above the manufacturer cost or a specified sum; and
establishing retailer profit data as either a percentage above the sum of the manufacturer cost and the distributor profit data, or a specified sum.

21. The method of claim 20 further comprising:
varying distributor profit data among the goods distributed by the distributor; and
varying retailer profit data among the goods sold by the retailer.

22. The method of claim 20 further comprising:
establishing distributor profit data as the same for each of the goods distributed by the distributor; and
establishing retailer profit data as the same for each of the goods sold by the retailer.

23. The method of claim 20 further comprising:
determining a retail price of the plurality of goods using by the manufacturer coat, the distributor profit data, and the retailer profit data for the good.

24. The method of claim 20 further comprising:
providing the goods using two or more levels of distributors but only the selected distributor fills the order;
determining a retail price of the plurality of goods by using the manufacturer cost, the distributor profit data for each of the participating distributors, and the retailer profit data for the good; and
wherein processing a monetary transaction further comprises:
crediting all distributors who participated in providing the goods a sum representing their portion of the total value of the order.

25. The method of claim 18 further comprising:
receiving the order from either a consumer or one of the plurality of retailers.

26. The method of claim 18 wherein selecting a distributor comprises:
identifying one distributor capable of filling the order such that the distributor is geographically closest to either a customer or a customer selected retailer.

27. The method of claim 26 wherein selecting a distributor further comprises:
identifying one distributor that is in the same country as the customer.

28. The method of claim 18 further comprising:
debiting the total value of the order against a credit card account of the customer.

29. The method of claim 28 wherein debiting the total value is performed after the order is shipped.

30. The method of claim 28 wherein processing a monetary transaction is performed immediately after debiting the total value.

31. The method of claim 18 wherein processing a monetary transaction is performed at a defined regular interval for multiple orders after the orders have shipped.

32. The method of claim 18 wherein processing a monetary transaction comprises:
   retaining a commission.

33. The method of claim 18 further comprising:
   obtaining goods-related data from each of the retailers, each of the distributors, and each of the manufacturers.

34. The method of claim 33 wherein obtaining goods-related data comprises:
   obtaining a product data from each of the manufacturers;
   obtaining an inventory data from each of the distributors; and
   obtaining a product line data from each of the retailers.

35. A method comprising:
   obtaining price data in a computer, the price data from each of a plurality of retailers, a plurality of distributors, and a manufacturer for a plurality of goods;
   receiving an order at the computer, the order for at least one of the plurality of goods;
   selecting one of the plurality of distributors to fill the order;
   electronically processing a monetary transaction for the order such that the distributor selected to fill the order, one of the plurality of retailers, and the manufacturer are each contemporaneously credited with a sum representing their portion of a total value of the order according to the price data.

36. The method of claim 35 wherein obtaining price data comprises:
   obtaining a manufacturer cost for the goods supplied by the manufacturer;
   obtaining from each of the distributors a distributor profit data for the goods inventoried by the distributor; and
   obtaining from each of the retailers a retailer profit data for the goods sold by the retailer.

37. The method of claim 36 determining a retail price of the plurality of goods by using the manufacturer cost, the distributor profit data, and the retailer profit data for the good.

38. The method of claim 35 further comprising:
   establishing distributor profit data as either a percentage above the manufacturer cost or a specified sum; and
   establishing retailer profit data as either a percentage above the sum of the manufacturer cost and the distributor profit data, or a specified sum.

39. The method of claim 35 wherein receiving an order comprises:
   receiving an order from either a consumer or one of the plurality of retailers.

40. The method of claim 35 wherein selecting a distributor comprises:
   selecting one distributor capable of filling the order such that the distributor is geographically closest to a customer or a customer selected retailer.

41. The method of claim 35 wherein processing a monetary transaction comprises:
   debiting the total value of the order against a credit card account of a customer.

42. A machine readable medium having stored thereon instructions which when executed by a processor cause the machine to perform operations comprising:
   obtaining price data from each of a plurality of retailers, a plurality of distributors, and at least one manufacturer for a plurality of goods;
   receiving an order for at least one of the plurality of goods;
   selecting one of the plurality of distributors to fill the order;
   processing a monetary transaction for the order such that the distributor selected to fill the order, one of the plurality of retailers, and the manufacturers of the goods in the order are each contemporaneously credited with a sum representing their portion of a total value of the order according to the price data.

43. The machine readable medium of claim 42 wherein obtaining price data causes the machine to perform operations comprising:
   obtaining a manufacturer cost for goods supplied by each of the manufacturers;
   obtaining from each of the distributors a distributor profit data for of the goods the distributor distributes; and
   obtaining from each of the retailers a retailer profit data for the goods the retailer sells.

44. The machine readable medium of claim 43 further comprising:
   determining a retail price of the plurality of goods by using the manufacturer cost, the distributor profit data, and the retailer profit data for the good.

45. The machine readable medium of claim 42 further comprising:
   establishing distributor profit data as either a percentage above the manufacturer cost or a specified sum; and
   establishing retailer profit data as either a percentage above the sum of the manufacturer cost and the distributor profit data, or a specified sum.

46. The machine readable medium of claim 42 wherein receiving an order causes the machine to perform operations comprising:
   receiving the order from either a consumer or one of the plurality of retailers.

47. The machine readable medium of claim 42 wherein selecting a distributor causes the machine to perform operations comprising:
   selecting one distributor capable of filling the order such that the distributor is geographically closest to either a customer or a customer selected retailer.

48. The machine readable medium of claim 47 wherein selecting a distributor causes the machine to perform operations comprising:
   selecting the one distributor that is in the same country as the customer.

49. The machine readable medium of claim 42 wherein processing a monetary transaction causes the machine to perform operations comprising:
   debiting the total value of the order against a credit card account of a customer.

50. The machine readable medium of claim 42 wherein processing a monetary transaction causes the machine to perform operations comprising:
   retaining a commission responsive to the total value of the order.

51. The machine readable medium of claim 42 further causing the machine to perform operations comprising:
   obtaining goods-related data from each of the retailers, each of the distributors, and each of the manufacturers.

52. The machine readable medium of claim 51 wherein obtaining goods-related data causes the machine to perform operations comprising:
   obtaining a product data from each of the manufacturers;
   obtaining an inventory data from each of the distributors; and
   obtaining a product line data from each of the retailers.

53. A method comprising:
   obtaining product data and price data in a computer, the product data and price data for a plurality of goods from each of a plurality of retailers, a plurality of distributors, and a plurality of manufacturers;
   receiving orders at the computer, the orders for some of the plurality of goods from a plurality of customers;

obtaining credit card authorization for the orders in the computer;

selecting one of the plurality of distributors to fill each of the orders;

receiving as acknowledgement when each order ships at the computer;

debiting the credit card accounts of the customers in the computer;

crediting the distributors, the retailers, and the manufacturers in the computer at a defined time after orders have been shipped with a sum representing their portion of a total value of the orders shipped according to the price data; and calculating a retained commission for the orders in the computer.

\* \* \* \* \*